United States Patent [19]
Bacso et al.

[11] 3,907,844
[45] Sept. 23, 1975

[54] 3-OXIMINO-17α-PROPADIENYL-SUBSTITUTED-4,9-GONADIENES

[75] Inventors: Imre Bacso, Morristown, N.J.; Eugene E. Galantay, Liestal, Switzerland

[73] Assignee: Sandoz Inc., East Hanover, N.J.

[22] Filed: Sept. 19, 1973

[21] Appl. No.: 398,566

Related U.S. Application Data

[63] Continuation-in-part of Ser. No. 154,190, June 17, 1971, abandoned.

[52] U.S. Cl. ........... 260/397.5; 260/397.4; 424/238
[51] Int. Cl.² ............................................. C07J 7/00
[58] Field of Search/Machine Searched Steroids; 260/397.5

[56] References Cited
UNITED STATES PATENTS

| | | | |
|---|---|---|---|
| 3,211,756 | 10/1965 | Mazur | 260/397.1 |
| 3,299,107 | 1/1967 | Mazur | 260/397.5 |
| 3,501,508 | 3/1970 | Shroff | 260/397.5 |
| 3,507,888 | 4/1970 | Klimstra | 260/397.3 |
| 3,532,689 | 10/1970 | Shroff | 260/239.55 |

*Primary Examiner*—Elbert L. Roberts
*Attorney, Agent, or Firm*—Gerald D. Sharkin; Richard E. Vila; Frederick H. Weinfeldt

[57] ABSTRACT

The compounds are 3-oximino-17α-propadienyl-substituted steroids, e.g., 17α-propadienylestra-4,9-dien-17β-ol-3-one oxime, and are useful in the regulation of reproduction in warm-blooded animals.

5 Claims, No Drawings

3-OXIMINO-17α-PROPADIENYL-SUBSTITUTED-4,9-GONADIENES

This is a continuation-in-part of copending application Ser. No. 154,190 (filed June 17, 1971), now abandoned.

This invention relates to steroidal compounds, and more particularly to 3-oximino-17α-propadienyl-substituted-4,9-gonadienes and to the preparation of such compounds as well as to therapeutic compositions which contain such compounds and the use of such compounds.

The compounds of this invention, i.e., Compounds I, are conveniently represented by the formula:

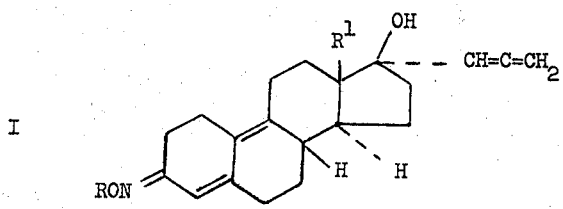

wherein
R is a hydrogen atom or lower alkanoyl, e.g. having from two to four carbon atoms, such as acetyl, propionyl and butyryl, including isomeric forms where they exist, but are preferably unbranched; and
$R^1$ is unbranched alkyl having from one to three carbon atoms, i.e., methyl, ethyl or n-propyl.

Compounds I are prepared from suitable 3-ketones, i.e., Compounds II;

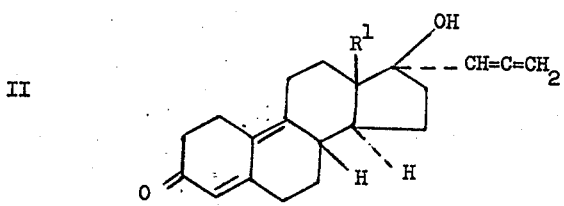

wherein $R^1$ is defined above, by conventional means for preparing an oxime derivative from a 3-keto-steroid (Process a). For example, by treatment of a suitable 3-keto steroid (II) with a suitable hydroxylamine reagent, to yield the oxime, i.e., a Compound I wherein R is a hydrogen atom, and further treatment thereof where a compound I is desired wherein R is alkanoyl, with an alkanoylating agent (Process b).

3-Keto-steroids suitable as starting materials (compounds II) for the preparation of compounds I are described in the literature, e.g. in Belgian Pat. Nos. 742,137 and 766,147 and U.S. Pat. Nos. 3,661,940 and 3,719,670.

A convenient method for carrying out Process (a) to obtain a Compound I wherein R is a hydrogen atom, involves treating a Compound II, under anhydrous conditions, with a hydroxylamine reagent, preferably hydroxylamine acetate in an inert organic solvent, e.g. a lower alkanol, such as methanol or ethanol, at moderate temperatures, e.g. conveniently at room temperature, or at other temperatures preferably lower than the reflux temperature of the solvent. The hydroxylamine reagent may be prepared separately or in situ, e.g. from a hydroxylamine salt, e.g. the hydrochloride, and a base such as sodium acetate, sodium hydroxide or pyridine. Where pyridine is employed as base, it may serve in excess as solvent for the reaction.

A convenient method of carrying out Process (b) to obtain a Compound I wherein R is lower alkanoyl, involves treating a Compound I wherein R is a hydrogen atom, with an alkanoylating agent. It is preferred that in Process (b) alkanoylating agents which are not strongly acidic be employed, as the 17α-propadienyl-substituent may be adversely affected by such conditions. A lower aliphatic acid or acid anhydride may be used as the alkanoylating agent in the presence of an acid binding agent, e.g. acetic acid anhydride with pyridine. The alkanoylation reaction may be carried in an inert organic solvent, e.g. benzene, at moderate temperatures, e.g. −10° to 50°C., preferably at room temperature. Where the alkanoylating agent is suitable as a solvent, it may be used in excess to serve as solvent.

The Compounds I prepared as described above may be recovered and refined by means conventional in the art, e.g. by recrystallization or column or layer chromatography.

The compounds of formula (I) are useful because they possess pharmacological properties in animals. In particular, such compounds exhibit progestational activity and are therefore useful in the control of fertility in female warm-blooded animals and regulation of estrus or the menstrual function thereof, and in addition are also useful as luteolytic agents in the prevention or interruption of pregnancy in such animals. The progestational activity is indicated by the wellknown Clauberg test; the method basically described in Endocrinology 63 (1958) 464 wherein a rabbit is given 0.001 mg. to 1.0 mg. of active agent. Luteolytic activity is indicated by selecting female estrous white rats from a colony, treating them with the test compound for 4 days and then caging them with fertile males; beginning on the following day, the females are treated for an additional 10 days with the compound being tested; and on the third day following the last treatment the females are sacrificed and the uteri checked for implantation sites (the absence or regression of which being taken as a positive result). Luteolytic activity may also be indicated by a rabbit pseudopregnancy test in which adult New Zealand White female rabbits are injected intravenously with 100 international units of Human Chorionic Gonadotrophin (HCG) to induce ovulation and formation of corpora lutea (pseudopregnancy. The day of treatment with HCG is considered day-1 of pseudopregnancy. Immediately prior to the HCG treatment a 2 ml. blood sample (via heart puncture) is collected. Two ml. blood samples are obtained on various days through day-12 of pseudopregnancy. On day-3 of pseudopregnancy, groups of females are treated orally or injected subcutaneously with corn oil (controls) or the test compound in corn oil. Treatments are continued through day-8 of pseudopregnancy. Blood samples are analyzed for progestin content according to the method of Johansson et al. (Endocrinology Vol. 82, 143–148, 1968). A compound is judged to be luteolytic if plasma progestin levels have returned to pretreatment levels by day-12 of pseudopregnancy. Luteolytic activity may be further demonstrated in the Rhesus monkey by a test in which treatments with the test compound are initiated 4 days following the estrogen surge and continued daily for a total of six treatments (last treatment on day-9 following the estrogen surge). Blood levels of progestins are monitored daily by the abovementioned method of Johansson et al. A compound is judged to be active if blood levels of progestins are returned to base line levels and maintained at these levels as compared to control females. Positive results demonstrate a luteolytic activity of the compound in a menstrual cycling species.

These compounds may be combined with a pharmaceutically acceptable carrier or adjuvant in a manner which is conventional in the pharmaceutical art. They may be administered orally or parenterally. The dosage will vary depending upon the mode of administration utilized and the particular compound employed. However, in general, satisfactory results are obtained in female warm-blooded animals, e.g. mammals, when the compounds are administered at a daily dosage of from about 0.005 mg. to 30 mg., e.g. about 0.015 mg. to 10 mg. to control fertility or regulate estrus or the menstrual function; and for the prevention or interruption of pregnancy by luteolytic activity at a daily dosage of from about 1 mg. to 100 mg., e.g. from about 1 mg. to 20 mg. daily for from about 1 to 6 days during the luteal phase. Convenient dosage forms suitable for internal administration comprise from about 0.005 mg. to 100 mg., e.g. from 0.015 mg. to 20 mg. of the compound in admixture with a solid or liquid pharmaceutical carrier or diluent.

The compounds I of this invention contrast with the known compound 17α-propadienylestra-4,9-dien-17βol-3-one which has a different spectrum of activity, e.g. it has significant estrogenic activity.

A representative formulation suitable for oral administration is a capsule (250 mg.) prepared by standard techniques which contains the following:

| Ingredient | Weight (mg.) |
| --- | --- |
| 17α-propadienylestra-4,9-dien-17β-ol-3-one oxime | 5 |
| Inert solid diluent (starch, lactose, kaolin) | 245 |

In the following examples, illustrating the invention, all temperatures are C. and room temperature is 20° to 30°C., unless indicated otherwise.

EXAMPLE 1

17α-Propadienylestra-4,9-dien-17β-ol-3-one oxime

A solution of 5.0 g. of 17α-propadienylestra-4,9-dien-17β-ol-3-one in 42 ml. of absolute ethanol is mixed with a solution of hydroxylamine acetate (prepared from 3.23 g. of hydroxylamine hydrochloride and 11.3 g. of sodium acetate trihydrate in 42 ml. of absolute ethanol, the resulting solids being filtered off). The resulting mixture is kept at room temperature for one-half hour. The reaction mixture is then diluted with water and the solids which have separated are collected by filtration to give the title product, 17α-propadienylestra-4,9-dien-17β-ol-3-one oxime, m.p. 93° to 119°C.

Repeating the procedure of this example but replacing the 17α-propadienylestra-4,9-dien-17β-ol-3-one used therein with an equivalent amount of 13-ethyl-17α-propadienyl-gona-4,9-dien-17β-ol-3-one or 17α-propadienyl-13-n-propylgona-4,9-dien-17β-ol-3-one, there is obtained 13-ethyl-17α-propadienylgona-4,9-dien-17β-ol-3-one oxime, or 17α-propadienyl-13-n-propylgona-4,9-dien-17β-ol-3-one oxime.

EXAMPLE 2

N-Acetoxy-17α-propadienylestra-4,9-dien-17β-ol-3-one oxime

A solution of 3.0 g. of 17α-propadienylestra-4,9-dien-17β-ol-3-one oxime (obtained in Example 1) in 30.0 ml. of pyridine is treated with 10.0 ml. of acetic anhydride and kept at room temperature for 1 hour. The solution is then diluted with ice water and the separated solids are collected by filtration to give N-acetoxy-17α-propadienylestra-4,9-dien-17β-ol-3-one oxime.

Repeating the procedure of this example, but using an equivalent amount of 13-ethyl-17α-propadienylgona-4,9(10)-dien-17β-ol-3-one oxime, there is similarly obtained N-acetoxy-13-ethyl-17α-propadienylgona-4,9(10)-dien-17β ol-3-one oxime.

EXAMPLE 3

Tablets and Capsules Suitable for Oral Administration

Tablets and capsules containing the ingredients indicated below may be prepared by conventional techniques and are useful in the control of fertility in mammals:

| Ingredient | Weight (mg.) Tablet | Capsule |
| --- | --- | --- |
| 17α-Propadienylestra-4,9-dien-17β-ol-3-one oxime | 0.5 | 0.5 |
| tragacanth | 10 | — |
| lactose | 247 | 299.5 |
| corn starch | 25 | — |
| talcum | 15 | — |
| magnesium stearate | 2.5 | — |
| Total | 300 mg. | 300 mg. |

EXAMPLES 4 AND 5

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered in the control of fertility in mammals. The injectable suspension and oral liquid suspension are suitably administered once a day for this purpose.

| Ingredients | Weight (mg) Sterile Injectable Suspension | Oral Liquid Suspension |
| --- | --- | --- |
| 17α-Propadienylestra-4,9-dien-17β-ol-3-one oxime | 0.2 | 0.5 |
| Sodium carboxy methyl cellulose U.S.P. | 1.25 | 12.5 |
| Methyl cellulose | 0.4 | — |
| Polyvinylpyrrolidone | 5 | — |
| Lecithin | 3 | — |
| Benzyl alcohol | 0.01 | — |
| Magnesium aluminum silicate | — | 47.5 |
| Flavor | — | q.s. |
| Color | — | q.s. |
| Methyl paraben, U.S.P. | — | 4.5 |
| Propyl paraben, U.S.P. | — | 1.0 |
| Polysorbate 80 (e.g. Tween 80) | — | 5 |

-Continued

| Ingredients | Weight (mg) | |
| --- | --- | --- |
| | Sterile Injectable Suspension | Oral Liquid Suspension |
| U.S.P. Sorbitol solution, 70%, U.S.P. | — | 2,500 |
| Buffer agent to adjust pH for desired stability | q.s.* | q.s. |
| Water | for injection, q.s. to 1 ml. | q.s. to 5 ml |

*q.s. = quantity sufficient.

What is claimed is:
1. A compound of the formula:

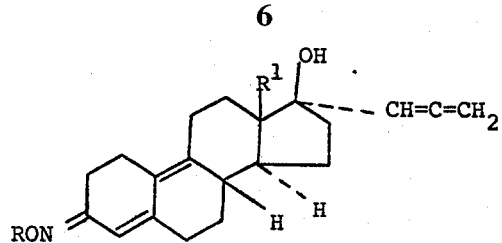

Wherein
R is a hydrogen atom or alkanoyl having from two to four carbon atoms;
$R^1$ is unbranched alkyl having from one to three carbon atoms.

2. A compound of claim 1 wherein R is a hydrogen atom.
3. The compound of claim 2 wherein $R^1$ is methyl.
4. A compound of claim 1 wherein R is alkanoyl.
5. A compound of claim 1 in which $R^1$ is methyl.

* * * * *